United States Patent [19]
Schmidt

[11] Patent Number: 6,002,729
[45] Date of Patent: Dec. 14, 1999

[54] METHOD FOR FRAME SYNCHRONIZATION

[75] Inventor: Kurt Schmidt, Grafing, Germany

[73] Assignee: Rohde & Schwarz GmbH & Co. KG, Munich, Germany

[21] Appl. No.: 08/918,475

[22] Filed: Aug. 26, 1997

[30] Foreign Application Priority Data

Sep. 25, 1996 [DE] Germany .................. 196 39 309

[51] Int. Cl.$^6$ .............. H04L 7/06; H04L 7/00; H03D 3/24

[52] U.S. Cl. ............ 375/364; 375/362; 375/365; 375/375; 375/343; 375/354; 370/324; 370/350; 370/503; 370/509

[58] Field of Search ................... 375/364, 365, 375/362, 375, 354, 373, 341, 343; 370/324, 350, 503, 509

[56] References Cited

U.S. PATENT DOCUMENTS

| | | | |
|---|---|---|---|
| 5,390,216 | 2/1995 | Bilitza et al. | 375/354 |
| 5,428,647 | 6/1995 | Rasky et al. | 375/366 |
| 5,444,697 | 8/1995 | Leung et al. | 370/207 |
| 5,729,396 | 3/1998 | Dudley et al. | 360/51 |
| 5,841,481 | 11/1998 | Yoshikawa | 348/500 |
| 5,914,931 | 6/1999 | Kang et al. | 370/203 |

OTHER PUBLICATIONS

"Optimum Frame Synchronization," Massey, IEEE Trans. on Comm., vol. Com. 20, Apr., 1972, pp. 115–119.

"Optimum Frame Synchronization for Asynchronous Packet Transmission," Mehlan et al., ICC, 1993 in Geneva, vol. 2/3, pp. 826–830.

*Primary Examiner*—Stephen Chin
*Assistant Examiner*—Michael W. Maddox
*Attorney, Agent, or Firm*—Hill & Simpson

[57] ABSTRACT

For frame synchronization, the time position of a synchronization sequence in a received data stream is determined before the frequency and phase synchronization according to the principle of the maximum likelihood theory; the maximum amount of the correlation between the differentially decoded, received data sequence with the conjugated-complex, differentially decoded synchronization sequence known at the reception side is thereby taken into consideration.

8 Claims, 5 Drawing Sheets

METHOD FOR FRAME SYNCHRONIZATION

BACKGROUND OF THE INVENTION

1. Field of the Invention

The present invention is directed to and proceeds from a method for determining the time position of a synchronization sequence in a received data stream (frame synchronization) according to the preamble of the generic claim.

2. Description of the Prior Art

A frame synchronization method of this general type is known (James L. Massey, "Optimum Frame Synchronization", IEEE Trans. on Comm., Vol. Corn. 20, April 1972, pp. 115–119 and R. Mehlan, H. Meyr, "Optimum Frame Synchronization for Asynchronous Packet Transmission", ICC 1993 in Geneva, Vol. 2/3, pp. 826–830). This type of frame synchronization method has the disadvantage that a clock, carrier and phase synchronization must be implemented before the actual frame synchronization. A carrier and phase synchronization without previously implemented frame synchronization and, thus, without knowledge of the data sequence, is only possible with methods known as Non-Data-Aided (NDA) methods. The theoretically allowed frequency deviation between transmitter and receiver given the transmission of higher level MQAM signals amounts to 12.5% of the symbol rate in such NDA methods and even amounts to only 1/M ·50% in MPSK. In TDMA transmissions, only the burst itself is available to be employed for clock, phase and carrier synchronization, and in known frame synchronization methods, the further problem exists of the time position of the burst being unknown, since the frame synchronization has not yet been implemented and can only be determined by additional auxiliary measures.

SUMMARY OF THE INVENTION

An object of the present invention is to provide a method for all linear modulation methods for determining the time position of a symbol sequence in a received data stream that avoids the aforementioned disadvantages.

The above object is achieved in accordance with the principles of the present invention in a method for determining the time position of a synchronization sequence in a received data stream (frame synchronization) with a frequency synchronization and a phase synchronization also being undertaken, wherein the frame synchronization is accomplished using maximum likelihood theory and wherein the frame synchronization is completed before undertaking the frequency and phase synchronization.

As a result of the inventively selected conditions for the application of the known maximum likelihood theory, it becomes possible to implement the frame synchronization immediately from the received data sequence before the carrier and phase synchronization, namely either before or after the clock synchronization. The time position of the synchronization sequence is thus already known for following method steps such as clock synchronization or carrier and phase synchronization, and, thus, the aforementioned disadvantages are avoided in the MQAM method and in the TDMA method. The result is that the theoretically allowed frequency deviation can amount to 50% of the symbol rate for all linear modulation methods.

DESCRIPTION OF THE PREFERRED EMBODIMENTS

Figure 1:
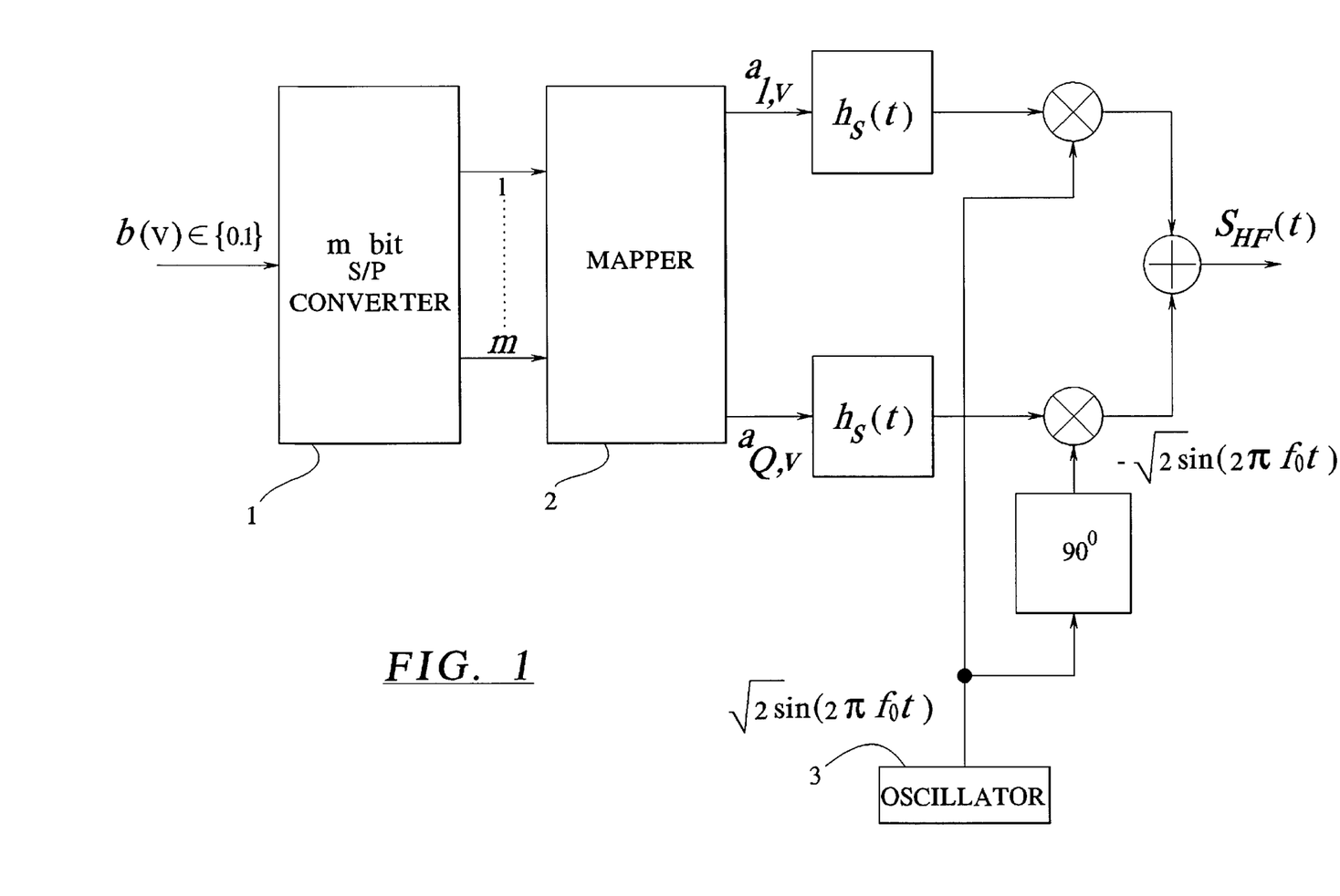
FIG. 1 is a schematic block diagram of a transmitter for QAM signals.

FIG. 1 schematically shows the transmitter side editing in general for linear modulation methods. Several bits (m bits) of the data stream to be transmitted are thereby combined in a serial-to-parallel converter 1 to form a more significant, complex symbol $a_v$. The complex signal space comprises M elements. Complex symbol values with real part $a_{I,v}$ and imaginary part $a_{Q,v}$ are generated in this way in a mapper 2, these being subsequently added by the carrier frequencies (phase-shifted by 90° relative to one another) generated by a carrier generator 3, to the radio-frequency signal to be transmitted. Given offset modulation methods, a delay by half a symbol period $T_s/2$ must be additionally undertaken in the quadrature branch before the modulation.

Figure 2:
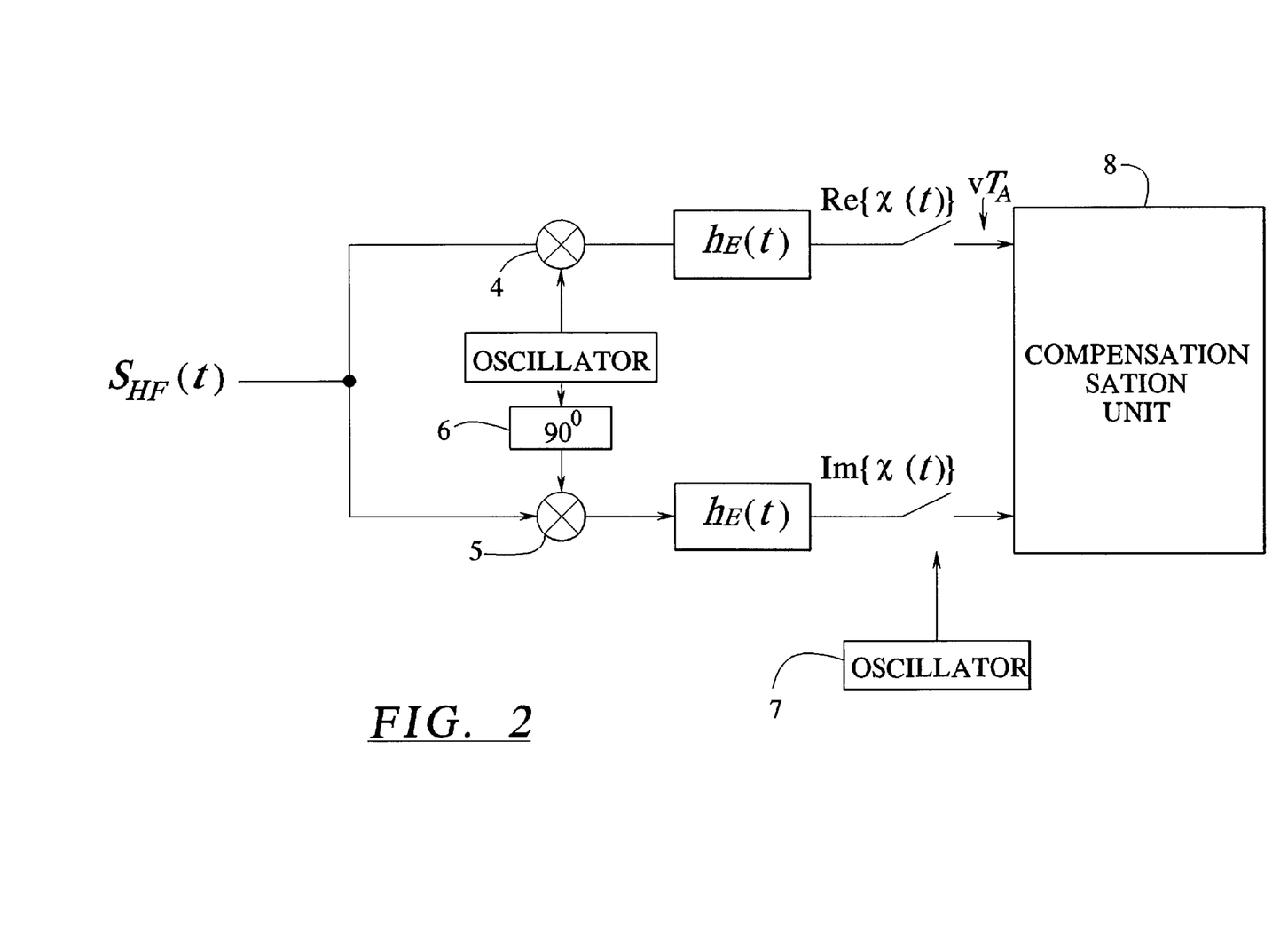
FIG. 2 is a receiver for receiving the QAM signals from the transmitter of FIG. 1, operating in accordance with the principles of the present invention.

FIG. 2 shows the appertaining quadrature receiver. The received radio-frequency signal is again mixed into the baseband in two mixers 4 and 5 with the beat frequencies of a carrier oscillator 6 that are phase-shifted by 90° relative to one another, and the baseband signals are subsequently sampled with a clock generator 7 whose clock frequency $f_A=1/T_A$ is a whole multiple of the symbol rate $f_s=1/T_s$. The sampling rate must be selected so high that the sampling theorem is satisfied. According to $$ov=f_A/f_s$$

The oversampling factor thereby indicates the ratio of sampling frequency to symbol rate.

By contrast to the feedback demodulation methods, the oscillator 6 is not readjusted to the carrier frequency and carrier phase; rather, the frequency of the oscillator 6 is set exactly to the transmitter-side carrier frequency with a maximally allowed deviation of 50 percent of the symbol rate. The clock generator 7 is also not regulated in phase; the clock frequency is merely set to the value of the corresponding modulation method. The following post-processing ensues in the arrangement 8 whose functioning is described below.

Figure 3:
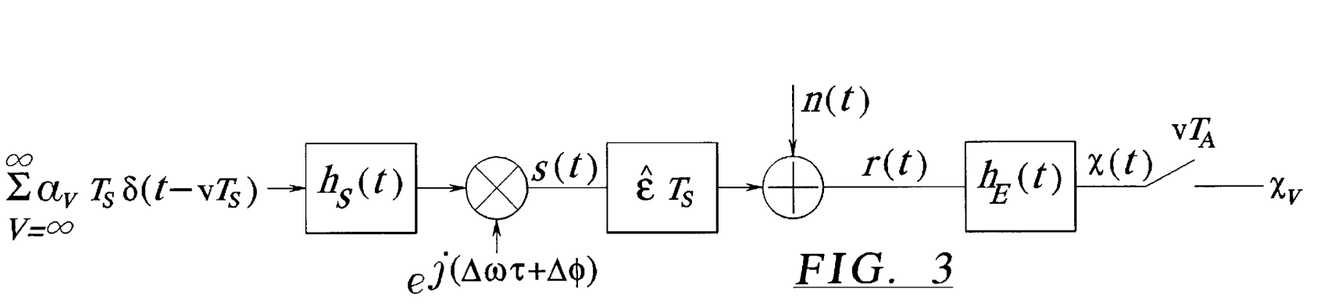
FIG. 3 is a block diagram showing the transmission model for the transmitter and receiver of FIGS. 1 and 2, in an equivalent baseband representation.

FIG. 3 shows the transmission model described with reference to FIGS. 1 and 2 in the equivalent baseband representation. The point of departure is the digital, complex dirac sequence weighted with the symbols that is to be transmitted $$\sum_{V=-\infty}^{\infty} a_v T_s \delta(t - vT_s)$$

This signal can be represented as the sum of two dirac pulses weighted with the symbol values $a_{I,v}$, $a_{Q,v}$ at the times $t=v \cdot T_s$ in real and imaginary part. The symbols $$a_v = a_{I,v} + j a_{Q,v}$$

can assume the values $a_{I,v}, a_{Q,v} \in \{\pm 1, \pm 3 \pm 5, \ldots\}$, for example in the modulation method MQAM. Further, other linear modulation methods such as, for example, $\pi/4$-QPSK with $a_{I,v}, a_{Q,v} \in \{\pm 1 e^{j v \pi/4}, \pm j e^{j v \pi/4}\}$ or the MQAM method are possible, whereby the imaginary part $a_{Q,v}$ is delayed by half a symbol period. Subsequently, the symbol sequence is forwarded to the transmission filter with the pulse response $h_s(t)$.

The transmission signal $s(t)$ is obtained by $$s(t) \left[ \sum_{v=-\infty}^{\infty} a_{I,v} T_s h_s(t_s - vT_s) + j \sum_{v=-\infty}^{\infty} a_{Q,v} T_s h_s(t_s - vT_s) \right] \cdot e^{j(\Delta \omega \tau + \Delta \Phi)}$$

The unknown frequency offset $\Delta f$ ($w=2\pi f$) and phase offset $\Delta \Phi$ between transmitter and receiver is taken into consideration by multiplication by the rotation pointer $e^{j(2\Delta f t + \Delta \Phi)}$.

The time offset $\epsilon T_s$ (unknown in the receiver) compared to the ideal sampling times is realized by the following symbol block. The values $\epsilon$ thereby lie in the range $$-0.5 \leq \epsilon < 0.5.$$

The delayed transmission signal is disturbed by additive white Gaussian noise (AWGN) $n(t)$ on the transmission link; the reception signal $r(t)$ arises. The noise signal is complex in value according to $$n(t) = n_I(t) + j n_Q(t).$$

The real part $n_I(t)$ and the imaginary part $n_Q(t)$ have the two-sided power density spectrum (LDS) $N_0/2$ and are statistically independent of one another. The average power of the transmitted signal $s(t)$ yields $$P_s = \overline{E\{|s(t)|^2\}} = \frac{1}{T_s} \int_0^{T_s} E\{|s(t)|^2\} dt$$

since the anticipation value is time-dependent and periodic with $T_s$. The average symbol energy of the transmission signal is calculated as $$E_s = P_s \cdot T = \overline{E\{|s(t)|^2\}} \cdot T_s = \int_0^{T_s} E\{|s(t)|^2\} dt$$

Figures 4, 5, 6:
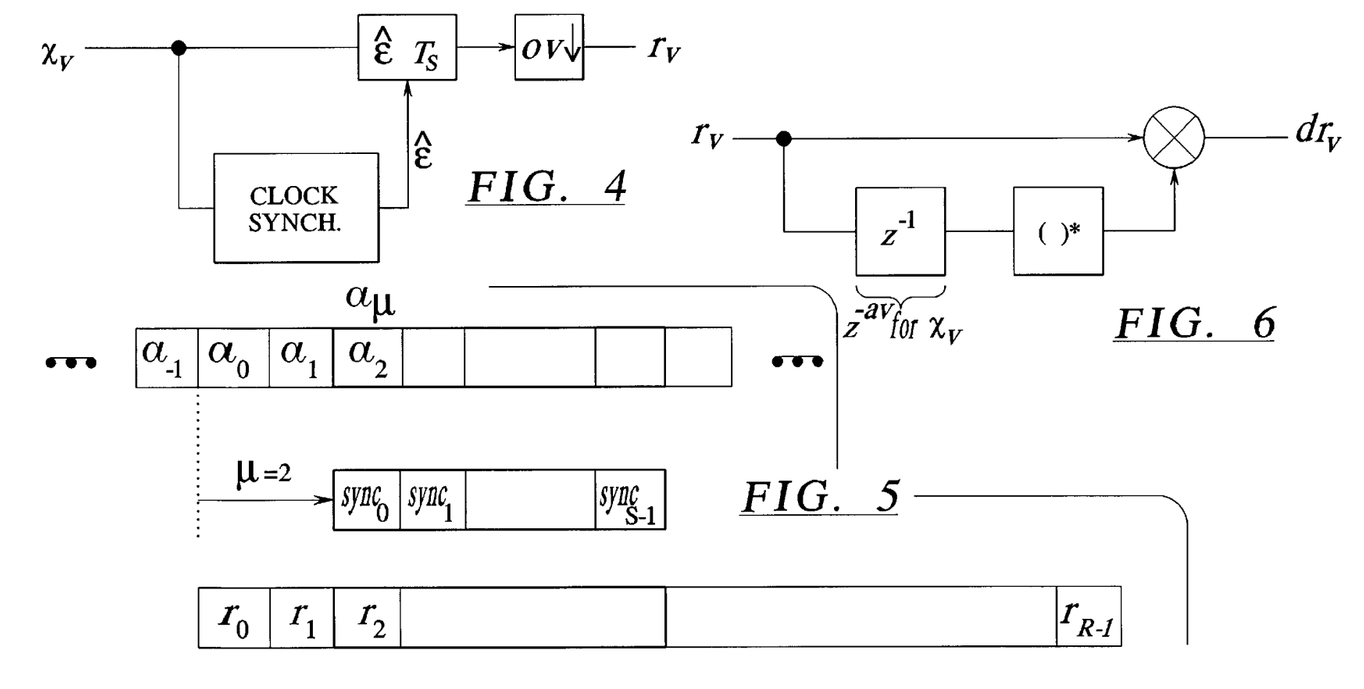
FIG. 4 is a block diagram illustrating the synchronization technique in accordance with the invention.
FIG. 5 illustrates the embedding of the sync sequence in the transmitted symbol sequence.
FIG. 6 is a block diagram illustrating the differential decoding which takes place in the receiver in accordance with the invention.

FIG. 4 shows the synchronization concept with the input sequence $x_v$ of FIG. 3. This sequence is used for the clock synchronization with subsequent compensation with the estimated time offset $\epsilon T_s$. The clock synchronization ensues without knowledge of the transmitted symbols (Non-Data-Aided) and is uncritical. After under-scanning by the oversampling factor ov, only the samples $r_v$ are present at the symbol times free of inter-symbol interference. In the offset methods, the delay by half the symbol period must be reversed before the under-sampling. The subsequently derived frame synchronization can be undertaken either from the sequence $x_v$ that is not timing-compensated or from the sequence $r_v$ that is only present at the symbol times. The frame synchronization with the sequence $x_v$ that is not timing-compensated can be required, for example, when a TDMA system is present and only the burst whose time position is still unknown can be employed for the timing estimation. Given frame synchronization with $x_v$, the still remaining deviation from the symbol time (maximum of half a sampling period) is subsequently estimated and reversed by the clock synchronization.

Due to the simpler nomenclature, the derivation of the method is implemented for the sequence $r_v$. The derived method is likewise valid for the sequence $x_v$ that is not timing-compensated. The important difference is that, due to the still unknown symbol time, the sync sequence must be sought in the sampling raster and not in the symbol raster. Given frame synchronization by the sequence $x_v$, the sequence is not present exactly at the symbol time and an additional error arises due to inter-symbol interferences. The oversampling factor ov should therefore amount to at least ov=4 in this case.

FIG. 5 shows the embedding of the sync sequence $sync_v$ in the transmitted symbol sequence $a_v$. The length of the sync sequence amounts to S symbols. The sync sequence begins after $\mu$ symbol periods following the zero point in time. The job of the frame synchronization is comprised in determining this time position that is unknown in the receiver. The sync sequence is known in the receiver. In FIG. 4, $\mu=2$ is shown by way of example. The processing in the receiver begins at the zero point in time. R samples of the sequence $r_v$ are evaluated for the frame synchronization. It is also assumed that the length R of the reception vector r is selected so large that a complete sync sequence is contained.

A. Clock Synchronization

The sequence $x_v$ in FIG. 4 is used for clock phase estimating of the unknown, normed time offset $\epsilon$. The method for clock synchronization is feedback-free and known (K. Schmidt, Digitale Taktrückgewinnung für bandbreiteneffizente Mobilfunksystems, Dissertation, Inst. für Nachrichtentechnik, Darmstadt, December 1993, and Oerder, Algorithmen zur digitalen Taktsynchronisation bei Datenübertragung, Chair for Elektrische Regelungstechnik, Aachen, 1989). Subsequently, the estimated time shift $\hat{\epsilon} T_s$ (the circumflex is generally employed for estimates) is in turn reversed by an interpolation filter. Subsequently, and under-sampling is made by the oversampling factor ov and the symbol that are still phase-rotated arise in the sequence $r_v$. Basic observations about compensation can be found in (K. Schmidt, Digitale Taktrückgewinnung für bandbreiteneffizente Mobilfunksystems, Dissertation, Inst. für Nachrichtentechnik, Darmstadt, December 1993, and Kammeyer, "Nachrictenübertragung", Teubner-Verlag, Stuftgart, 1992).

B. Frame Synchronization

The point of departure is formed by the maximum likelihood function according to Equation (1)

$$L(\mu, \Delta \tilde{\omega}, \Delta \tilde{\Phi}) = \underbrace{e^{\frac{-1}{N_0} \sum_{v=\tilde{\mu}}^{\tilde{\mu}+S-1} |r_v \cdot e^{-j(\Delta \tilde{\Phi} v T_s + \Delta \tilde{\Phi})} - sync_{v-\tilde{\mu}}|^2}}_{1^{st} \text{ term}} \cdot \qquad (1)$$

$$\underbrace{E_a \left\{ e^{\frac{-1}{N_0} \sum_{v_{rest}} |r_v \cdot e^{-j(\Delta \tilde{\Phi} v T_s + \Delta \tilde{\Phi})} - a_v|}\right\}^2}_{2^{nd} \text{ term}}$$

that is to be maximized by variation of the test parameter $\tilde{\mu} = [0, R-S]$. According to $v_{rest} = [0, \mu[ \text{ and } ]\mu+S-1, R-1]$ $v_{rest}$ thereby describes the v-range of the vector r outside the suspected sync sequence with the random symbols $a_v$. Basically, the test parameters are provided with a tilde (~) and estimated parameters are provided with a circumflex. In the following steps, the declaration is made that all terms irrelevant for the method are set to one without defining a new function.

First, the first term in Equation (1) is simplified and Equation (2) is obtained:

$$1^{st} \text{ term} = e^{\frac{-1}{N_0}\sum_{v=\tilde{\mu}}^{\tilde{\mu}+S-1}|r_v|^2 + |sync_{v-\tilde{\mu}}|^2 - 2\text{Re}\{r_v \cdot e^{-j(\Delta\tilde{\omega}vT_s + \Delta\tilde{\Phi})} \cdot sync^*_{v-\tilde{\mu}}\}} \quad (2)$$

$$= const_1 \cdot e^{\frac{-1}{N_0}\sum_{v=\tilde{\mu}}^{\tilde{\mu}+S-1} 2\text{Re}\{r_v \cdot e^{-j(\Delta\tilde{\omega}vT_s + \Delta\tilde{\Phi})} \cdot sync^*_{v-\tilde{\mu}}\}}$$

In the second term in Equation (1), the random sequence $a_v$ is not known, for which reason the anticipation value with respect to this sequence must be formed:

$$2^{nd} \text{ term} = E_a\left\{e^{\frac{-1}{N_0}(\sum_{v_{rest}}|r_v|^2 + |a_v|^2 - 2\text{Re}\{r_v \cdot e^{-j(\Delta\tilde{\omega}vT_s + \Delta\tilde{\Phi})} \cdot a^*_v\})}\right\} \quad (2)$$

$$= E_a\left\{\prod_{v_{rest}} e^{\frac{-1}{N_0}\left(\frac{|r_v|^2 + |a_v|^2}{v_{rest}} - 2\text{Re}\{r_v \cdot e^{-j(\Delta\tilde{\omega}vT_s + \Delta\tilde{\Phi})} \cdot a^*_v\}\right)}\right\}$$

By exploiting the statistical independence of the symbols $a_v$, $$2^{nd} \text{ term} \approx const_2 \cdot \prod_{v_{rest}} E_{a_v}\left\{e^{\frac{1}{N_0} 2\text{Re} r_v \cdot e^{-j(\Delta\tilde{\omega}vT_s + \Delta\tilde{\Phi})} \cdot a^*_v}\right\} \quad (3)$$

also derives.

A signal-to-noise ration of $E_s/N_0 \gg 1$ is assumed below. Given the actual frequency and phase offset, Equation (3) can then be approximated by $$2^{nd} \text{ term} \approx const_2 \cdot \prod_{v_{rest}} e^{\frac{1}{N_0} 2|r_v| \cdot |a_v|} \quad (4)$$

Since the random sequence $a_v$ is not known, the estimated value $\hat{a}_v$ is employed. Note that it is not the symbol but only the amount thereof that must be estimated. Accordingly, a frequency and phase synchronization is not needed therefor. By inserting Equations (2, 4) into Equation (1) and subsequent logarithmization, one obtains the log likelihood function $$l(\tilde{\mu}, \Delta\tilde{\omega}, \Delta\tilde{\Phi}) = \ln[L(\tilde{\mu}\Delta\tilde{\omega}, \Delta\tilde{\Phi})] \quad (5)$$

$$= \underline{const} \cdot \left(\sum_{v=\tilde{\mu}}^{\tilde{\mu}+S-1} \text{Re}\{r_v \cdot e^{-j(\Delta\tilde{\omega}vT_2 + \Delta\tilde{\Phi})} \cdot sync^*_{v-\tilde{\mu}}\} + \sum_{v_{rest}} |r_v| \cdot |\hat{a}_v|\right)$$

In order to obtain identical summation limits in the two terms, the right side of Equation (5) is additionally expanded with the constant $$-\sum_{v=0}^{R-1} |r_v| \cdot |\hat{a}_v|$$

for simplification and the log likelihood function according to Equation (6) is then obtained $$l(\tilde{\mu}, \Delta\tilde{\omega}, \Delta\tilde{\Phi}) = \sum_{v=\tilde{\mu}}^{\tilde{\mu}+S-1} \text{Re}\{r_v \cdot e^{-j(\Delta\tilde{\omega}vT_2 + \Delta\tilde{\Phi})} \cdot sync^*_{v-\tilde{\mu}}\} - |r_v| \cdot |\hat{a}_v| \quad (6)$$

Illustration: The first term in Equation (6) describes a correlation between the frequency-compensated and phase-compensated reception sequence with the conjugated-complex sync sequence, and the second term can be viewed as a measure for noise elimination. This is simple to understand when one proceeds on the basis of an error-free estimation of $|\hat{a}_v|$. The approximation $$|r_v| \cdot |\hat{a}_v| \approx \text{Re}\{r_v \cdot e^{-j(\Delta\tilde{\omega}vT_2 + \Delta\tilde{\Phi})} \cdot a^*_v\}$$

can then be inserted into Equation (6) and, given exact frequency and phase compensation, one obtains $$l(\tilde{\mu}, \Delta\omega, \Delta\Phi) = \sum_{v=\tilde{\mu}}^{\tilde{\mu}+S-1} \text{Re}\{r_v \cdot e^{-j(\Delta\tilde{\omega}vT_2 + \Delta\tilde{\Phi})} \cdot (sync_{v-\tilde{\mu}} - a_v)^*\}$$

At the sync time $\tilde{\mu} = \mu$ with $sync_{v-\mu} = a_v$, accordingly, the maximum $l(\mu, \Delta\omega, \Delta\Phi) = 0$ derives exactly and is thus disturbance-free at the sync time.

However, the log likelihood function in Equation (6) to be maximized is still dependent on the frequency and phase offset. The goal of the following approximations is therefore to eliminate these dependencies. To that end, the log likelihood function in Equation (6) is viewed given the actual frequency and phase offset. By transposition of sum and real part formation, one obtains $$l(\tilde{\mu}, \Delta\tilde{\omega}\Delta\tilde{\Phi}) = \text{Re}\left\{\sum_{v=\tilde{\mu}}^{\tilde{\mu}+S-1} r_v \cdot e^{-j(\Delta\tilde{\omega}vT_2 + \Delta\tilde{\Phi})} \cdot sync^*_{v-\tilde{\mu}}\right\} - \sum_{v=\tilde{\mu}}^{\tilde{\mu}+S-1} |r_v| \cdot |\hat{a}_v|$$

At the sync time, the internal products of the first term, leaving the disturbance out of account, are exactly real, so that the approximation $$l(\tilde{\mu}, \Delta\tilde{\omega}) = \left|\sum_{v=\tilde{\mu}}^{\tilde{\mu}+S-1} r_v \cdot e^{-j(\Delta\tilde{\omega}vT_2 + \Delta\tilde{\Phi})} \cdot sync^*_{v-\tilde{\mu}}\right| - \sum_{v=\tilde{\mu}}^{\tilde{\mu}+S-1} |r_v| \cdot |\hat{a}_v| \quad (7)$$

$$= \underbrace{\left|\sum_{v=\tilde{\mu}}^{\tilde{\mu}+S-1} r_v \cdot e^{-j\Delta\tilde{\omega}vT_2} \cdot sync^*_{v-\tilde{\mu}}\right|}_{1^{ST} \text{ term}} - \underbrace{\sum_{v=\tilde{\mu}}^{\tilde{\mu}+S-1} |r_v| \cdot |\hat{a}_v|}_{2^{ND} \text{ term}}$$

can be made and, thus, the log likelihood function becomes independent of the phase offset. In order to be able to analytically estimate the frequency offset, the two terms in Equation (7) are squared by a further approximation and one obtains $$l(\tilde{\mu}, \Delta\tilde{\omega}) = \left| \sum_{v=\tilde{\mu}}^{\tilde{\mu}+S-1} r_v \cdot e^{-j\Delta\tilde{\omega}vT_2} \cdot \text{sync}_{v-\tilde{\mu}}^* \right|^2 - \left( \sum_{v=\tilde{\mu}}^{\tilde{\mu}+S-1} |r_v| \cdot |\hat{a}_v| \right)^2$$

$$= \sum_{v_1=\tilde{\mu}}^{\tilde{\mu}+S-1} \sum_{v_2=\tilde{\mu}}^{\tilde{\mu}+S-1} r_{v_1} \cdot r_{v_1}^* \cdot \text{sync}_{v-\tilde{\mu}}^* \cdot \text{sync}_{v_2-\tilde{\mu}} - |r_{v_1} \cdot r_{v_2}| \cdot |\hat{a}_{v_i}| \cdot |\hat{a}_{v_2}|$$

By substitution of the indices, one ultimately obtains $$l(\tilde{\mu}, \Delta\tilde{\omega}) = \sum_{v=\tilde{\mu}}^{\tilde{\mu}+S-1} |r_v|^2 \cdot |\text{sync}_{v-\tilde{\mu}}|^2 - |r_v|^2 \cdot |\hat{a}_v|^2 + \sum_{\alpha=1}^{S-1} 2\,\text{Re}$$

$$\left\{ \underbrace{e^{-j\Delta\tilde{\omega}\alpha\cdot T_1} \sum_{v=\tilde{\mu}}^{\tilde{\mu}+S-1} r_{v_1} \cdot r_{v-\alpha}^* \cdot \text{sync}_{v-\tilde{\mu}}^* \cdot \text{sync}_{v-\alpha-\tilde{\mu}} - |r_{v_1} \cdot r_{v_2}| \cdot |\hat{a}_{v_1}| \cdot |\hat{a}_{v-\alpha}|}_{S-\alpha\text{ Summations}} \right\}$$

For shorter notation, the second term was placed into the real part bracket despite real significance. One can see that, with α=0, a correlation of the symbol energies was made in the first line, this being unusable for MPSK. The α=1 summand has the advantage that the estimation range of the frequency range is maximum and can also be analytically determined, as shall be shown below. The consequence of the omission of the remaining summands is that a loss in signal-to-noise ratio is accepted, which is generally acceptable. The loss thereof shall be discussed later. With this approximation, the log likelihood function derives:

$$l(\tilde{\mu}, \Delta\tilde{\omega}) = \underbrace{2}_{\text{irrelevant}} \text{Re} \left\{ e^{-j\Delta\tilde{\omega}\alpha\cdot T_1} \sum_{v=\tilde{\mu}}^{\tilde{\mu}+S-1} r_{v_1} \cdot r_{v-1}^* \cdot \text{sync}_{v-\tilde{\mu}}^* \cdot \text{sync}_{v-1-\tilde{\mu}} - \right.$$

$$\left. |r_{v_1} \cdot r_{v-1}^*| \cdot |\hat{a}_{v_1}| \cdot |\hat{a}_{v-1}| \right\}$$

Note that only S-1 summations now occur. With the definitions of Equation (8)

$$dr_v = r_v \cdot r_{v-1}^*$$

$$d\text{sync}_v = \text{sync}_v \cdot \text{sync}_{v-1}^* \qquad (8)$$

one obtains $$l(\tilde{\mu}, \Delta\tilde{\omega}) = \text{Re} \left\{ e^{-j\Delta\tilde{\omega}\alpha\cdot T_2} \sum_{v=\tilde{\mu}+1}^{\tilde{\mu}+S-1} dr_v \cdot d\text{sync}_{v-\tilde{\mu}}^* \right\} - \sum_{v=\tilde{\mu}+1}^{\tilde{\mu}+S-1} |dr_v| \cdot |\hat{a}_{v_1}| \cdot |\hat{a}_{v-1}| \qquad (9)$$

Figure 7:
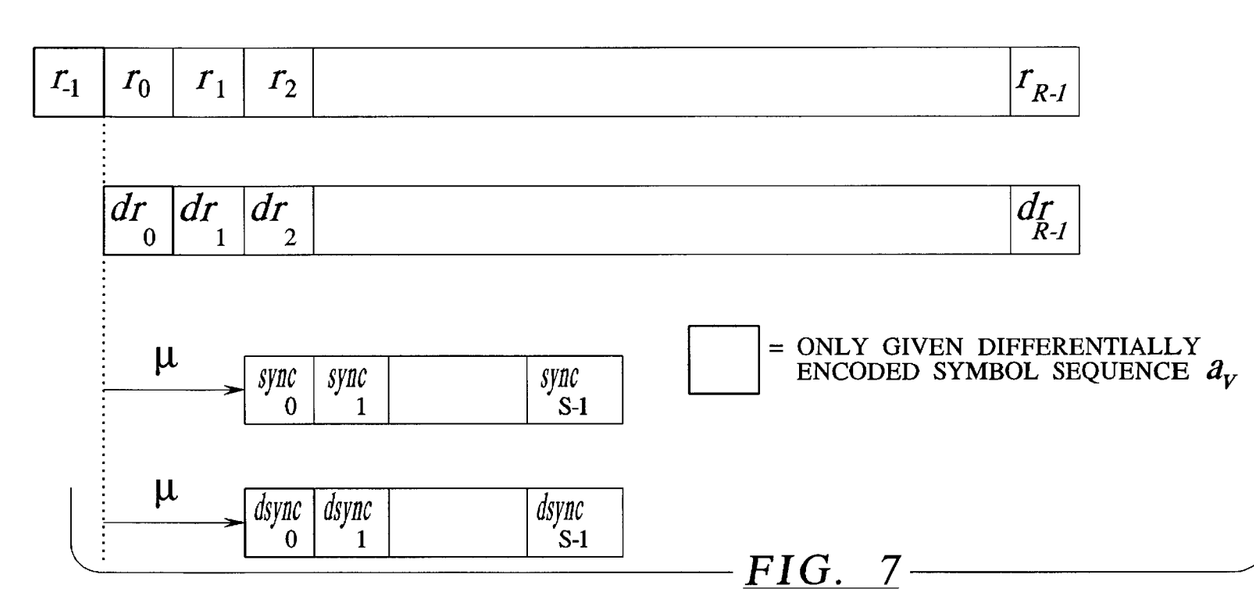
FIG. 7 illustrates the differentially decoded sequence.

The differential decoding of the reception sequence is shown in FIG. 6. Note that the sequence $\text{sync}_v$ in fact begins at v=0 but the differential sequences $d\text{sync}_v$ only begins at v=1 due to the delay by a symbol period (see Equation (9)). This limitation, however, does not apply in the following algorithm when $a_v$ is a differentially encoded sequence because $d\text{sync}_0$ is then known. This situation is illustrated again in FIG. 7.

The maximization of the log likelihood function in Equation (9) can thus be simplified by two cascaded maximizations: First, the maximization is implemented for $\mu$. One can see that, due to the frequency offset in the first term given $\Delta f = \Delta f$, effects a correlation $\text{korr}(\mu)$ with respect the real part axis. Accordingly, $|\text{korr}(\mu)|$ can also be maximized in a good approximation. The estimation rule for the sync time $\hat{\mu}$ thus derives by maximization of Equation (10).

$$l(\hat{\mu},) = \text{Re} \left| \underbrace{\sum_{v=\hat{\mu}+1}^{\hat{\mu}+S-1} dr_v \cdot d\text{sync}_{v-\tilde{\mu}}^*}_{1^{st}\text{ term}} \right| - \underbrace{\sum_{v=\hat{\mu}+1}^{\hat{\mu}+S-1} |dr_v| \cdot |\hat{a}_{v_1}| \cdot |\hat{a}_{v-1}|}_{2^{nd}\text{ term}} \qquad (10)$$

***not given differential encoding of $a_v$

The evaluation of only the $1^{st}$ term suffices given a high signal-to-noise ratio because the gain of about 3 dB in the signal-to-noise ration achieved by the $2^{nd}$ term is not necessary then.

As already mentioned at the beginning, the rule in Equation (10) is also valid for the sequence that is not timing-compensated. Instead of the sequence $r_v$, the sequence $x_{ov\,v+}$ with $\lambda$=[0, ov−1] must then be used in Equation (8). The index is necessary because the evaluation of the log likelihood function must be implemented in the sampling raster and not in the symbol raster. The result is that the signal processing outlay rises by the factor ov.

If one would like to obtain an optimally exact frequency estimation value, the frequency estimation described below should be implemented with $r_v$ and not with the assistance of $x_v$. The estimated frequency value derives given an estimated $\hat{\mu}$ from Equation (9): The log likelihood function becomes maximum when the real part expression of Equation (9) is purely real and positive. The estimated frequency value thus derives with Equation (11).

$$\Delta \tilde{f} = \frac{1}{2\pi T_s} \cdot \arg\{\text{korr}(\hat{\mu})\} \qquad (11)$$

with $\text{korr}(\mu)$ of Equation (9). Note that the frequency offset to be estimated can be both positive as well as negative. Consequently, the argument in Equation (11) dare not exceed the phase π for the purpose of an unambiguous determination. The theoretically allowable frequency offset of $$|\Delta f/f_s| \leq 0.5$$

is thus obtained.

A different derivation is obtained from the consideration that the sampling theorem in a sample/symbol period is only satisfied for rotation pointers whose frequency is lower than half the symbol frequency.

Since the allowable frequency offset is smaller in the Non-Data-Aided methods (for example, by the factor four in MQAM), a greater frequency offset between transmitter and receiver is also allowable due to the rough estimation according to Equation (11).

Due to the approximations that have been carried out, Equation (11) is not a matter of the optimum estimated value. Nonetheless, the maximum likelihood estimator can be alternatively implemented for modulation methods with $|a_v|$ using a calculating rule that is only somewhat more calculation-intensive. The basis for the calculation is known from the literature (Jack K. Wolf, Jay W. Schwartz, "Comparison of Estimators for Frequency Offset", IEEE Trans. on Comm., 1990, pp. 124–127). By contrast to the method proposed in the literature, however, a pointer averaging is implemented instead of a phase averaging. Among other things, this planar filtering has the advantage that, given $|\Delta f/f_s| \to 0.5$, the overall pointer lies in the corresponding quadrant with higher probability because of the averaging effect. Given phase averaging, by contrast, a "maverick" caused by disturbances would make the estimated value unusable. Example: $|\Delta f/f_s|=0.45$, i.e. the disturbance-free pointer would have to have a phase of −162 degrees. If a maverick were to lie in the 3$^{rd}$ quadrant with a phase of, for example, +185 degrees, the result given phase averaging is unusable because of the operational sign wrap at ±180 degrees. Consequently, nearly the theoretically allowed frequency range of $|\Delta f/f_s|=0.5$ can be allowed due to the pointer averaging. The calculating rule derives from Equation (12)

$$\Delta f = \frac{1}{2\pi T_s} \cdot \arg\left\{\underbrace{\sum_{v=\bar{\mu}+1}^{\bar{\mu}+S-1} koeff_v \cdot dr_v \cdot dsync_{v-\bar{\mu}}^*}_{\text{overall pointer}}\right\} \quad (12)$$

with the coefficients $$koeff_v = \frac{6v \cdot (S-v+1)}{S \cdot (S+1) \cdot (S+2)}$$

The advantage increases with increasing sync length S due to the optimum estimation according to equation (12). Given S=21, for example, the standard deviation of the estimation error is reduced by the factor 2.

If the variance of the estimation error is too great due to a sync sequence, there is also the possibility of reducing the error variance by filtering the individual frequency estimation values (for example, Kalman filter). For the above-described reasons, a planar filtering of the overall pointer of the individual frequency estimation values with subsequent, normed argument formation is recommendable.

It may be desirable to know how big the signal-to-noise ratio loss is, compared to the frame synchronization with previous frequency and phase compensation with the synchronization rule according to Equation (6). The important difference is that the differentially decoded sequence $Dr_v$ is employed instead of the sequence $r_v$. With $$r_v = a_v + \underset{\text{variance } \sigma^2}{n_v}$$

the following derives given the differentially decoded sequence $$dr_v = r_v \cdot r_{v-1}^*$$
$$= (a_v + n_v) \cdot (a_{v-1} + n_{v-1})^*$$
$$= a_v a_{v-1}^* + a_v n_{v-1}^* + a_{v-1}^* n_v + \underbrace{n_v n_{v-1}}_{\text{negligible for } E_{2/N_0}\gg 1}$$
$$\quad\quad\quad\quad \underbrace{\phantom{a_v n_{v-1}^* + a_{v-1}^* n_v}}_{\text{disturbance } dn_v}$$

The cross-product of the noise sequence can be neglected given a high signal-to-noise ratio. one can see that the disturbance $dn_v$ is uncorrelated, as is $n_v$. When one proceeds on the basis of the modulation method MPSK with $|a_v=$ const$|$, the normed value $$\frac{dr_v}{a_{v-1}} = a_v + \frac{a_v}{\underbrace{\frac{a_{v-1}}{|\cdots|=1}}} n_{v-1} + n_v$$
$$\underset{\text{variance } 2\sigma^2}{}$$

derives.

Since the neighboring samples of the noise sequence $n_v$ are uncorrelated, the noise variance given MPSK is thus increased by the factor 2, this corresponding to a signal-to-noise ration loss of 3 dB. Since the performance of the frame synchronization is essentially dependent on the ratio of energy of the sync sequence to the noise power density according to $E_{sync}/N_0$ and is generally big, this loss represents a problem only given transmission links with an extremely low signal-to-noise ratio and a short sync sequence.

Figure 8:
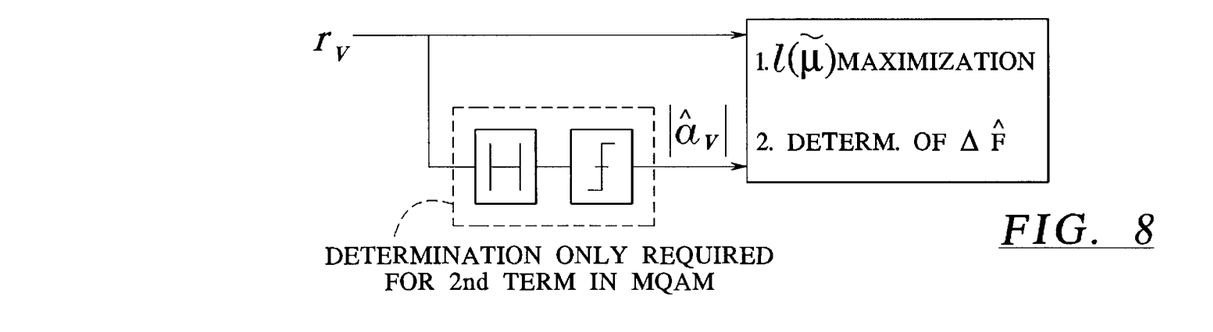
FIG. 8 is a block diagram illustrating the basic frame synchronization and frequency estimation steps in accordance with the invention.

The basic steps of the frame synchronization and frequency estimation are shown again in FIG. 8.

Figure 9:
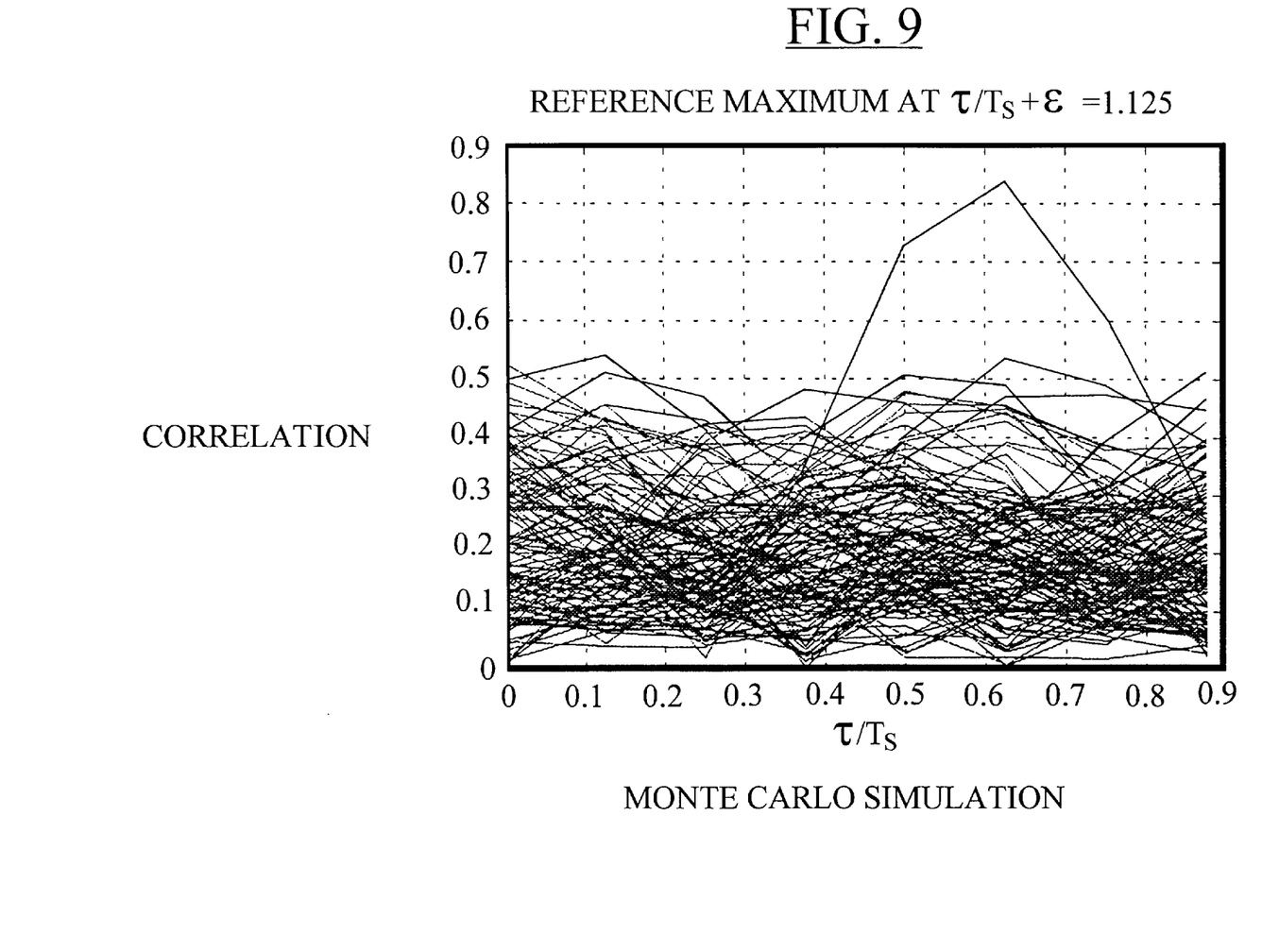
FIG. 9 shows a Monte Carlo simulation for frame synchronization in accordance with the principles of the present invention.

For demonstrating the performance capability, FIG. 9 shows a Monte Carlo simulation for frame synchronization of a π/4-DQPSK transmission with root Nyquist transmission and reception filter with a roll-off factor of r=0.35. This Figure shows the eye pattern of the correlation term in Equation (10), i.e., due to the omission of the 2$^{nd}$ term, this is not even the optimum method. The extended training sequence of the TETRA mobile radiotelephone with S=15 symbols was employed as sync sequence. The frame synchronization was implemented by the sequence $x_v$ that was not timing-compensated. The following parameters were also set:

ov=4, ϵ=0.5/ov=0.125, $\Delta f/f_s$=0.2, $E_s/N_0$=8 dB, i.e. this is the worst case since the symbol times lie exactly in the middle between the samples. Further, a big frequency offset of 20% of the symbol rate and small signal-to-noise ratio of $E_s/N_0$=8 dB were prescribed. One can see from the Figure that the maximum of the correlation appears at the sample closest to the sync time and, thus, the sync time was correctly estimated. The residual offset ϵ is canceled in the following timing compensation.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for determining a time position of a synchronization sequence in a received data stream comprising the steps of:
   conducting a frame synchronization, a frequency synchronization and a phase synchronization of the received data stream;
   conducting said frame synchronization using maximum likelihood theory; and
   completing said frame synchronization and conducting said frequency synchronization and said phase synchronization after said frame synchronization.

2. A method as claimed in claim 1 wherein the step of conducting said synchronization using maximum likelihood theory comprises identifying a maximum correlation amount of a correlation between a differentially decoded, received data sequence and conjugate-complex, differentially decoded synchronization sequence which is known at a location at which said received data stream is received.

3. A method as claimed in claim 1 comprising the additional step of adding a term for noise elimination.

4. A method as claimed in claim 1 comprising the additional step of conducting a clock synchronization of said received data stream, and wherein said frame synchronization is conducted before said clock synchronization.

5. A method as claimed in claim 1 comprising the additional step of conducting a clock synchronization of said received data stream, and wherein said frame synchronization is conducted after said clock synchronization.

6. A method as claimed in claim 1 comprising the additional step of identifying a carrier frequency offset according to said maximum likelihood theory from samples of said received data stream after frame synchronization thereof, said samples being defined by the time position produced by said frame synchronization.

7. A method as claimed in claim 6 wherein the step of conducting said synchronization using maximum likelihood theory comprises identifying a maximum correlation amount of a correlation between a differentially decoded, received data sequence and conjugate-complex, differentially decoded synchronization sequence which is known at a location at which said received data stream is received.

8. A method as claimed in claim 6 comprising the additional step of conducting an average over a complex sequence produced from said synchronization sequence, with subsequent argument formation.

* * * * *